July 31, 1945.  G. H. PALM  2,380,608
CONTROL VALVE
Filed Aug. 13, 1942
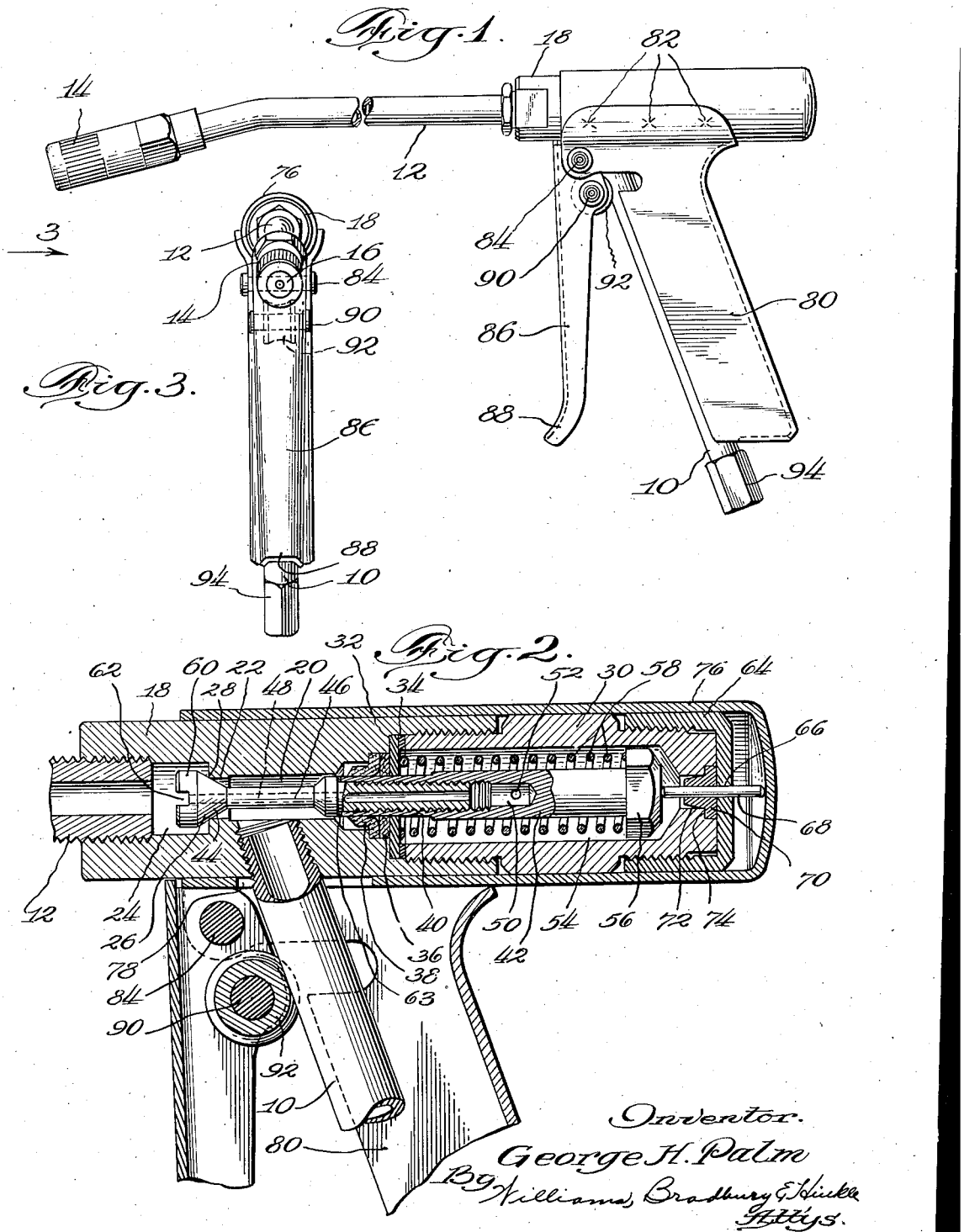
Inventor.
George H. Palm
By Williams, Bradbury & Hinkle
Attys.

Patented July 31, 1945

2,380,608

UNITED STATES PATENT OFFICE 2,380,608

CONTROL VALVE

George H. Palm, Chicago, Ill., assignor to Stewart-Warner Corporation, Chicago, Ill., a corporation of Virginia Application August 13, 1942, Serial No. 454,667

9 Claims. (Cl. 251—134)

My invention pertains to control valves, and is more particularly concerned with a control valve of the kind used in connection with high pressure lubricating apparatus for lubricating the bearings of automobiles and other machinery.

In lubricating the bearings of automobiles and other machinery, it is common to provide the bearing parts with nipples or fittings which are permanently attached thereto. A power operated pump or compressor supplies lubricant under extremely high pressures, since the bearings frequently become clogged with a mixture of dirt and grease residue, and these high pressures are necessary to dislodge this mixture and to force fresh lubricant into bearing parts and to the bearing surfaces.

The resistances of various bearings to the introduction of fresh lubricant differs widely, and consequently the lubricant pressure in the transmission line leading from the lubricant compressor to the fitting attached to the bearing likewise varies over wide limits.

My invention relates to a control valve particularly adapted to be interposed in the line between the nipple or fitting attached to the bearing and the lubricant compressor, so that an operator may easily control, by manual force, the flow of lubricant from the compressor to the bearing.

An object of my invention is to provide a control valve for high pressure lubricating apparatus, which requires a minimum manual force to open the valve and hold it open for all types of bearings.

Another object of my invention is to provide a control valve which may be easily disassembled and reassembled for inspection, cleaning, and repair.

Another object of my invention is to provide a control valve having a minimum of parts and having those parts so designed that they may be readily manufactured in large quantities by mass production methods, with conventional equipment.

Another object of my invention is to provide a control valve which will give long and trouble-free service, and which is not appreciably affected by impurities contained in the lubricant.

Other objects and advantages will become apparent as the description proceeds.

In the drawing:

Fig. 1 is a side elevation of a control valve embodying my invention;

Fig. 2 is a sectional view showing the operating mechanism of the control valve of Fig. 1; and Fig. 3 is an end elevation looking in the direction of the arrow 3 of Fig. 1.

In Fig. 1, I have illustrated a control valve having an inlet pipe 10 adapted to be connected to the discharge conduit of a power operated lubricant compressor of any usual or conventional type. The control valve is provided with a rigid discharge pipe or conduit 12 terminating in a coupler 14, which is illustrated as being of the quick detachable type having jaws 16 for making a quick detachable connection with the lubricant receiving nipple or fitting attached to the bearing of the automobile or other machine. The coupler 14 is preferably threadedly attached to the outlet end of the pipe 12 and may be removed entirely or replaced by other couplers for use with other types of nipples or fittings.

As best shown in Fig. 2, the inlet pipe 10 is screwed into a cylindrical body 18 and the discharge pipe 12 is also screwed into the body 18. The inlet pipe 10 conducts lubricant to a chamber 20, connected by a port 22, with an outlet chamber 24 communicating with the discharge pipe 12. A valve member 26 cooperates with a valve seat 28 to control flow of lubricant through the port 22 and thereby to control communication between the inlet pipe 10 and the discharge pipe 12 terminating in the coupler 14.

A sleeve 30 is threaded to one end of the body 18 and steel washer 32 and copper gasket 34 are clamped between the body 18 and sleeve 30. The steel washer 32 forms a backing plate for a leather washer 36 and hat washer 38, which is preferably made of Neoprene, or similar suitable material. This hat washer 38 seals against the cylindrical surface 40 provided by an extension 42 threadedly attached to the right-hand end of the valve member 26.

The valve member 26 has a tapered portion 44 which engages the valve seat 28 and an intermediate reduced portion 46 lying in the chamber 20. A passage 48 extends lengthwise of the valve member 26 and connects the discharge chamber 24 with a bore 50 formed in the extension 42 attached to the right-hand end of the valve member 26. Cross bores 52 connect the bore 50 with a chamber 54 formed in the sleeve 30, so that the chamber 54 is always in communication with the outlet chamber 24, and any pressure in the latter chamber and in the discharge pipe 12 is thus communicated to the chamber 54. The chamber 54, therefore, constitutes a pressure balancing chamber.

The extension 42 is provided with a head 56 and a spring 58 is confined between the head 56 and the steel washer 32, and functions to urge the tapered surface 44 of valve member 26 toward valve seat 28. The cylindrical surface 40 is of slightly larger diameter than port 22 and its annular valve seat 28, so that any lubricant pressure existing in chamber 20 cooperates with spring 58 in urging valve member 26 toward closed position. The difference in diameter between cylindrical surface 40 and port 22 is relatively slight, for example, five-thousandths of an inch, so that the manual force required to hold the valve member in open position is not great, even when the lubricant pressure existing in the chamber 20 is of a high order.

The head 60 of valve member 26 is preferably provided with a kerf 62 which may be engaged by a screw driver to facilitate screwing the right-hand end of this valve member into extension 42. The head 56 of extension 42 is preferably hexagonal so that it may readily be engaged by a wrench to facilitate this assembly operation. The kerf 62 and hexagonal head 56 also make it possible to disassemble and subsequently reassemble the valve member 26 and its extension 42 with conventional tools. A gasket 63 of copper, or other suitable material, is clamped between the right-hand end of extension 42 and a shoulder provided by the valve member 26.

The right-hand end of sleeve 30, as viewed in Fig. 2, is threaded to receive a cap 64 having a central opening 66 in which a small diameter pin 68 is reciprocably mounted. The pin 68 passes through a hat washer 70 of leather or other suitable material. This hat washer is located in a bore 72 formed in the sleeve 30 and is clamped against shoulder 74 by the cap 64.

The body 18, sleeve 30, and cap 64, are enclosed in a metal tube 76 which may be formed by a drawing operation or in any other suitable manner. The tube 76 is slidable relative to the body 18, sleeve 30, and cap 64, and has a slot 78 through which the inlet pipe 10 passes. This inlet pipe serves to hold the sleeve 76 in assembled position on the body 18, sleeve 30, and cap 64, and in order to remove this tube 76, it is only necessary to unscrew the inlet pipe 10 from the body 18.

A handle 80 is spot welded at 82, or otherwise attached to the tube 76. This handle 80 is formed of sheet metal which is preferably stamped to the desired configuration. A pivot pin 84 connects the handle 80 with a trigger 86 which may also be stamped from sheet metal of suitable thickness. The lower end of the trigger is curved, as indicated at 88, so that the parts may be more readily gripped in the hand of the operator.

A pin 90 is mounted in the trigger 86 and forms a support for a grooved roller 92 which engages the inlet pipe 10. This inlet pipe is preferably made of extra heavy material which is case hardened, as this pipe serves to hold the parts in assembled position and also serves as a fulcrum for the trigger 86 and associated parts, while the control valve is held in open position to permit lubricant to flow to the bearing to which the coupler 14 is connected. The nut or union 94 is preferably sweated to the end of the pipe 10 so that a tool may be applied to the hexagonal exterior of this nut to unscrew the pipe 10 from the body 18. The nut 94 is preferably internally threaded so that it may readily be connected to a discharge conduit of a lubricant compressor.

In the operation of my control valve, the operator grasps the handle 80 and trigger 86 and engages the coupler 14 with the nipple or fitting attached to the bearing to be lubricated. At this time, the parts are in the position shown in Figs. 1 and 2, and the valve member 26 prevents flow of lubricant to the discharge pipe 12 and coupler 14. This valve member is held in engagement with its valve seat 28 by spring 58 and the pressure existing in the inlet chamber 20.

It is common to use this control valve in connection with a power operated lubricant compressor having a pressure cut-off which causes the electric or air operated motor mechanism of the compressor to come to rest when the pressure in the discharge conduit of the compressor reaches a predetermined maximum. This discharge conduit is in direct communication with inlet chamber 20 and the closed position of valve member 26 causes the pressure to build up in the chamber 20 and discharge conduit of the compressor to the predetermined maximum which operates the shut-off mechanism of the compressor. The high pressure existing in the chamber 20 urges the valve member 26 toward closed position, since the cylindrical surface 40 with which the hat washer 38 cooperates to form a seal is slightly greater in diameter than the port 22 through the annular valve seat 28.

The operator then closes his hand to move the lower end of the trigger 86 closer to the handle 80. This causes the trigger to fulcrum about the point of engagement between the roller 92 and inlet pipe 10 and moves the pin 84, handle 80, and tube 76 to the left, as viewed in Figs. 1 and 2. The body 18, sleeve 30, and cap 64, remain stationary, and the leftward movement of tube 76 moves pin 68 toward the left and farther into the chamber 54. This pin engages head 56, thereby moving extension 42 and valve member 26 to the left and opening the valve to permit lubricant to flow through port 22 into outlet chamber 24, discharge pipe 12, and coupler 14. Since the coupler is firmly attached to the lubricant receiving fitting of the bearing, lubricant is discharged through this fitting to the bearing surfaces.

The resistance offered by the bearing to inflow of lubricant may be very small or very large, and this resistance will determine the pressure in the pipe 12 and discharge chamber 24. Chamber 24 communicates through passage 46 and bores 50 and 52 with chamber 54, so that any pressure existing in the discharge pipe acts upon pin 68 and thereby tends to move tube 76 to the right as viewed in Fig. 2. Pin 68, however, is of small diameter so that the force exerted thereon by the lubricant pressure is quite small, even when the bearing offers high resistance to inflow of lubricant.

When sufficient lubricant has been supplied to the bearing, the operator releases trigger 86, whereupon the parts return to the positions shown in the drawings. This return movement of the parts is accomplished jointly by the spring 58, the force exerted by the lubricant pressure on pin 68, and the force exerted by the lubricant pressure on valve member 26 tending to move it toward closed position. The spring 58 may be relatively light and since the forces exerted by the lubricant pressure acting on pin 68 and valve member 26 are small, my novel control valve may be easily operated under the most unfavorable conditions.

If it is desired to disassemble the control valve for inspection, cleaning, or repair, the pipe 10 is unscrewed from body 18 and this permits handle 80, trigger 86, and tube 76 to be slipped off of body 18, sleeve 30, and cap 64. These latter parts may then be readily unscrewed, and if desired or necessary, valve member 26 and its extension 42 may be unscrewed from each other to complete disassembly of the entire mechanism. The parts may be as readily reassembled and no special tools are required in either the disassembly or reassembly operations.

Any dirt or other impurities in the lubricant would ordinarily be confined to chamber 20, port 22, chamber 24, and discharge pipe 12, and would not pass through passage 46 to bore 50 or chamber 54. The tapered portion 44 of the valve member coacts with the edge of the annular valve seat 28, and in normal operation would displace any dirt or other impurity which might be located between these parts. Since cylindrical surface 40 slides in hat washer 38, there is little likelihood that dirt will interfere with the seal effected between these parts and the other parts of the mechanism are so constructed and arranged that impurities in the lubricant will not readily interfere with their normal operation.

All of the parts of my novel control valve may be made of conventional materials and by conventional equipment. These parts are so designed that they can be readily produced in large quantities by mass production methods, and can be readily and quickly assembled. The tolerances permissible are within the range normally encountered in mass production manufacture.

While I have illustrated and described only one embodiment of my invention, it is to be understood that my invention is not limited to the details shown and described. My invention is susceptible to numerous variations and modifications. The scope of my invention is defined in the following claims.

I claim:

1. In a control valve of the class described, the combination of a body having a valve seat therein, a valve coacting with said seat to control flow therethrough, means for opening and closing said valve, a housing slidable relative to said body to operate said valve, said housing having an opening therein, and an inlet pipe secured to said body, said pipe extending through said opening and constituting the sole means for holding said housing in place.

2. In a control valve of the class described, the combination of a tubular body having a valve seat therein, a valve member cooperating with said seat to control flow therethrough, said valve member having a reduced portion terminating in enlarged ends, one of said ends cooperating with said valve seat, and the other of said ends being of larger diameter than said seat, spring means for urging said valve member toward closed position, a cover slidable relative to said tubular body and spring means to move said valve member toward open position, and an inlet pipe for admitting fluid under pressure to the reduced portion of said valve member, said inlet pipe retaining said cover on said body.

3. A control valve of the class described comprising tubular means providing an outlet chamber, an inlet chamber, a valve seat between said chambers, and a pressure balancing chamber spaced from said inlet chamber, valve means cooperating with said seat to control flow therethrough and lying in all of said chambers, said valve means having a reduced portion in said inlet chamber and an enlarged portion in said inlet chamber spaced from said valve seat and of slightly larger diameter than said seat, sealing means engaging said valve means and separating said inlet chamber from said pressure balancing chamber, means providing a passageway between said outlet chamber and said pressure balancing chamber, a spring in said pressure balancing chamber for moving said valve member toward closed position, means slidable in the wall of said pressure balancing chamber for moving said valve member toward open position, and manually operated means for actuating said last-named means.

4. In a control valve of the class described, the combination of a tubular body having a valve seat therein, valve means coacting with said valve seat, a spring for urging said valve means toward closed position, a pin for moving said valve means to open position, a movable housing enclosing said body and adapted to engage said pin, valve means, spring, and pin, an inlet pipe for said body, a handle attached to said housing, and a trigger attached to said handle and engageable with said pipe to move said housing relative to said body and thereby engage said pin to open said valve means.

5. In a control valve of the class described, the combination of a tubular body adapted to have one end connected to a discharge conduit containing lubricant under pressure, said body having a valve seat therein, a valve member cooperating with said seat, said valve member having a part exposed to lubricant pressure to urge said valve member toward closed position, a pipe for admitting lubricant under pressure to said tubular body, a pin slidable in said body for moving said valve member to open position, a tube slidable on said body and having a part for actuating said pin, and means fulcruming on said pipe for moving said tube relative to said body to open said valve member.

6. In a control valve of the class described, the combination of means providing a tubular structure having a valve seat therein, a valve member cooperating with said valve seat to control flow of fluid therepast, means in said tubular structure for urging said valve member toward closed position, means closing one end of said tubular structure, a pin slidable in a wall of said structure, a drawn tube surrounding said tubular structure and slidable thereon, said tube having a closed end adapted to engage said pin to move said valve means to open position, a stamped handle welded to said tube, a stamped trigger pivoted to said handle, an inlet pipe attached to said tubular structure at one side of said seat, and means carried by said trigger and engageable with said pipe whereby movement of said trigger causes it to fulcrum about said pipe and produces relative movement between said tube and said tubular structure.

7. In a control valve of the class described, the combination of a tubular structure having a valve seat therein, a valve member engageable with said seat, an inlet pipe attached to said tubular structure at one side of said seat, a pin for moving said valve means to open position, a housing for said tubular structure and pin, said housing being slidable on said tubular structure and adapted to move said pin to open said valve means, a hollow handle attached to said housing, said inlet pipe extending lengthwise of said handle, and means interposed between said handle and pipe for moving said handle and tube relative to said pipe and tubular structure to open said valve means.

8. In a control valve of the class described, the combination of a tubular body having a valve seat therein, a sleeve threadedly attached to said tubular body, a steel washer and a copper gasket clamped between said body and sleeve, a valve member located in said tubular body, said valve member cooperating with said valve seat to control flow of fluid therepast, an extension attached to said valve member, said extension projecting into said sleeve and having a part slidable in said washer, sealing means forming a sealed joint between said last-named part and said washer, said last-named part being cylindrical and having a diameter slightly greater than said valve seat, a spring engaging said extension and urging said valve member toward closed position, said valve member and extension providing a passageway through said valve seat and past said seal, a pin for moving said extension and valve member to open position, sealing means between said pin and sleeve, means for moving said pin to shift said valve member to open position, and a fluid inlet for said tubular body, said inlet being located at one side of said valve seat.

9. In a control valve of the class described, the combination of a tubular body having a valve seat therein, a sleeve attached to one end of said tubular body, a cap for said sleeve, valve means in said tubular body coacting with said seat, said valve means having a cylindrical part extending into said sleeve, said cylindrical part having a diameter slightly greater than said valve seat, a spring in said sleeve for moving said valve means to closed position, means for forming a seal between one end of said tubular body and said cylindrical part, said valve means providing a passageway connecting the outlet side of said valve seat with the interior of said sleeve, means slidably projecting into said sleeve to shift said valve means to open position, a handle for supporting said body, means connecting said handle and said projecting means, an inlet pipe for said body to supply fluid thereto between said valve seat and the cylindrical part of said valve means, and means for moving said handle relative to said pipe.

GEORGE H. PALM.